United States Patent
Chen et al.

(10) Patent No.: US 12,022,322 B2
(45) Date of Patent: Jun. 25, 2024

(54) NULL DATA PACKET (NDP) ANNOUNCEMENT FRAME AND TRIGGER FRAME FOR EXTREMELY HIGH-THROUGHPUT (EHT)

(71) Applicant: Intel Corporation, Santa Clara, CA (US)

(72) Inventors: Cheng Chen, Camas, WA (US); Laurent Cariou, Portland, OR (US); Po-Kai Huang, San Jose, CA (US); Xiaogang Chen, Portland, OR (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 17/354,839

(22) Filed: Jun. 22, 2021

(65) Prior Publication Data

US 2021/0321293 A1   Oct. 14, 2021

Related U.S. Application Data

(60) Provisional application No. 63/046,358, filed on Jun. 30, 2020.

(51) Int. Cl.
*H04W 72/04* (2023.01)
*H04W 28/06* (2009.01)

(52) U.S. Cl.
CPC .......... *H04W 28/06* (2013.01); *H04W 72/04* (2013.01)

(58) Field of Classification Search
CPC ..... H04W 28/06; H04W 72/04; H04W 74/06; H04L 27/2603
See application file for complete search history.

(56) References Cited

U.S. PATENT DOCUMENTS

| 2014/0044112 A1* | 2/2014 | Stephens | H04W 24/10 370/328 |
| 2020/0154443 A1* | 5/2020 | Patil | H04W 72/30 |

(Continued)

OTHER PUBLICATIONS

Enhanced Trigger Frame for EHT Support; Qualcomm; Steve Shellhammer; Bin Tian; Yanjun Sun; Alfred Asterjadhi; Jan. 11, 2021, https://mentor.ieee.org/802.11/dcn/20/11-20-1429-05-00be-enhanced-trigger-frame-for-eht-support.pptx. (Year: 2021).*

(Continued)

*Primary Examiner* — Edan Orgad
*Assistant Examiner* — Malick A Sohrab
(74) *Attorney, Agent, or Firm* — Schwegman Lundberg & Woessner, P.A.

(57) ABSTRACT

An extremely high-throughput (EHT) station (STA) may encode a null data packet (NDP) announcement frame for transmission to include a high-efficiency (HE) subfield and a Ranging subfield in a Sounding Dialogue Token field. To identify the NDP announcement frame as an EHT NDP announcement frame (i.e., an EHT variant), the EHT STA may set both the HE subfield and the Ranging subfield in the Sounding Dialogue Token field to a value of one. When operating as an EHT access point (AP), the EHT STA may encode a trigger frame to include a Special User Info Field. The Special User Info Field may be identified by a predetermined value as an STA association identifier (AID) value. The use of the predetermined value as the AID value in the Special User Info Field indicates that the trigger frame is an EHT variant and indicates that the trigger frame is being sent by an EHT AP.

10 Claims, 3 Drawing Sheets

(56) References Cited

U.S. PATENT DOCUMENTS

| | | | | |
|---|---|---|---|---|
| 2021/0227529 | A1* | 7/2021 | Chu | H04W 72/23 |
| 2022/0095347 | A1* | 3/2022 | Huang | H04L 1/0047 |
| 2022/0201769 | A1* | 6/2022 | Li | H04W 74/0866 |
| 2023/0086669 | A1* | 3/2023 | Yu | H04L 5/0053 |
| | | | | 370/329 |
| 2023/0140556 | A1* | 5/2023 | Ko | H04W 74/0866 |
| | | | | 370/329 |

OTHER PUBLICATIONS

IEEE P802.11 Wireless LANs Specification framework for Tgbe Edward Au, Huawei, Date: Jan. 17, 2021 https://mentor.ieee.org/802.11/dcn/19/11-19-1262-23-00be-specification-framework-for-tgbe.docx (Year: 2021).*

* cited by examiner

NULL DATA PACKET (NDP) ANNOUNCEMENT FRAME AND TRIGGER FRAME FOR EXTREMELY HIGH-THROUGHPUT (EHT)

PRIORITY CLAIM

This application claims priority under 35 U.S.C. 119(e) to U.S. Provisional Patent Application Ser. No. 63/046,358, filed Jun. 30, 2020 [reference number AD0923-Z] which is incorporated herein by reference in its entirety.

TECHNICAL FIELD

Embodiments pertain to wireless communications. Some embodiments relate to IEEE P802.11be and extremely-high throughput (EHT) networks. Some embodiments relate to encoding null data packet (NDP) announcement frames for EHT. Some embodiments relate to encoding trigger frames for EHT.

BACKGROUND

There have been lots of discussions on reusing IEEE 802.11ax Trigger frames and NDP Announcement (NDPA) frames so that both IEEE 802.11ax and IEEE 802.11be STAs may be included to achieve backward compatibility. However, since IEEE 802.11be introduces several new features, There is a need to extend or modify existing IEEE 802.11ax Trigger frame and NDPA frame so that these new features are covered.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Currently there are two directions in the design of EHT Trigger frame and EHT NDPA frame. The first is going towards a new design that ensures forward compatibility. In contrast, the second option is to reuse existing 11ax Trigger frame and NDPA frame.

Designing a new EHT Trigger frame and NDPA frame is more straightforward and can ensure forward compatibility. However, it requires additional mechanisms to achieve backward compatibility if both HE and EHT STAs are to be included. In contrast, reusing existing 11ax Trigger frame and NDPA frame will easily guarantee backward compatibility.

In this disclosure, possible extension of existing 11ax Trigger frame is contemplated to cover the new features introduced in 11be, and meanwhile maintain backward compatibility with legacy HE STAs. These embodiments are described in more detail below.

Some embodiments are directed to an extremely high-throughput (EHT) station (STA). In these embodiments, the EHT STA may be configured to encode a null data packet (NDP) announcement frame for transmission. The NDP announcement frame may be encoded to include a high-efficiency (HE) subfield and a Ranging subfield in a Sounding Dialogue Token field. In these embodiments, to identify the NDP announcement frame as an EHT NDP announcement frame (i.e., an EHT variant), the EHT STA may set both the HE subfield and the Ranging subfield in the Sounding Dialogue Token field to a value of one.

In some embodiments, for a transmission of the NDP announcement frame to a very-high throughput (VHT) STA, the EHT STA may set both the HE subfield and the Ranging subfield to a value of zero to identify the NDP announcement frame as VHT NDP announcement frame. For a transmission of the NDP announcement frame to an HE STA, the EHT STA may set the HE subfield to a value of one and set the Ranging subfield to a value of zero to identify the NDP announcement frame as a HE NDP Announcement frame.

In these embodiments, the AID11 subfield does not need to be set to a special value to identify an NDP announcement frame as an EHT NDP announcement frame (i.e., an EHT variant). In some embodiments, the EHT STA may be configured to transmit the NDP announcement frame to solicit beamforming feedback from one or more associated STAs identified in the NDP announcement frame.

In some embodiments, the EHT STA may be an access point (AP) EHT STA. In some embodiments, the EHT STA may encode a trigger frame for transmission. When the EHT station is configured to operate as an EHT access point (AP), the EHT AP may encode the trigger frame to include a Special User Info Field, the Special User Info Field identified by a predetermined value as an STA association identifier (AID) value. In some embodiments, use of the predetermined value as the AID value in the Special User Info Field indicates that the trigger frame is an EHT variant and indicates that the trigger frame is being sent by an EHT AP. In some embodiments, an EHT AP may refrain from using the predetermined value as an AID value for any STA associated to the EHT AP.

In some embodiments, the predetermined value may be 2007 and the predetermined value may be included in an AID12 subfield to indicate that that the trigger frame is an EHT variant.

In some embodiments, the trigger frame is encoded to allocate resources to one or more non-AP STAs and to solicit one or more uplink trigger-based (TB) PPDUs from the one or more non-AP STAs. In these embodiments, in response to the trigger frame, the EHT STA may be configured to decode the one or more TB PPDUs from the one or more non-AP STAs.

In some embodiments, the EHT STA comprises a MAC layer and a PHY layer. For transmission of the NDP announcement frame, the MAC layer may be configured to encode the NDP announcement frame for transmission by the PHY layer. In some embodiments, the PHY layer includes a transceiver coupled to one or more antennas for transmission of the NDP announcement frame.

Some embodiments are directed to a non-transitory computer-readable storage medium that stores instructions for execution by processing circuitry of an extremely high-throughput (EHT) station (STA). In these embodiments, the processing circuitry may be configured to encode a null data packet (NDP) announcement frame for transmission. The NDP announcement frame may be encoded to include a high-efficiency (HE) subfield and a Ranging subfield in a Sounding Dialogue Token field. To identify the NDP announcement frame as an EHT NDP announcement frame, the processing circuitry may set both the HE subfield and the Ranging subfield in the Sounding Dialogue Token field to a value of one.

Some embodiments are directed to an extremely high-throughput (EHT) non-AP station (STA). In these embodiments, the EHT non-AP STA may be configured to decode a null data packet (NDP) announcement frame from an access point (AP), the NDP announcement frame including a high-efficiency (HE) subfield and a Ranging subfield in a Sounding Dialogue Token field. In these embodiments, the EHT non-AP STA may also be configured to identify the NDP announcement frame as an EHT NDP announcement frame if both the HE subfield and the Ranging subfield in the Sounding Dialogue Token field are set to a value of one.

In some embodiments, the EHT non-AP STA may also be configured to identify the NDP announcement frame as a very-high throughput (VHT) NDP announcement frame if both the HE subfield and the Ranging subfield are to a value of zero, and identify the NDP announcement frame as a HE NDP Announcement frame if the HE subfield is to a value of one and the Ranging subfield is set to a value of zero. These embodiments are described in more detail below.

Figure 1:
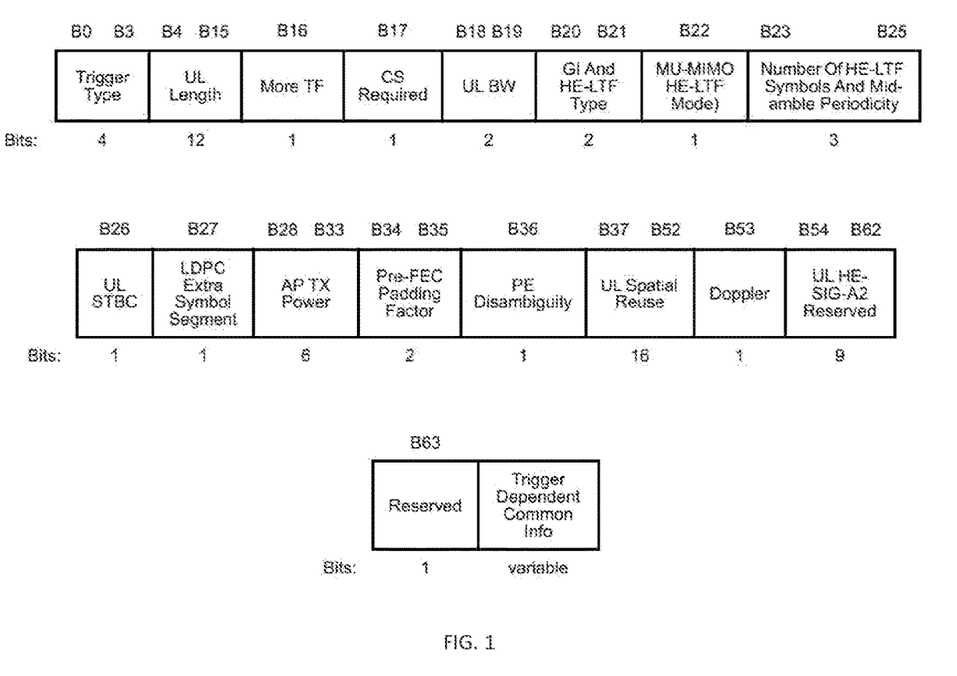
FIG. 1 illustrates a common Info field of a trigger frame, in accordance with some embodiments.

Trigger Frame:

The Common Info field of the Trigger frame is analyzed (see FIG. 1). There is 1 reserved bit in Common Info field of the Trigger frame. Depending on how many more additional bits are needed to cover EHT R1 features, the Trigger frame may need to be extended and modified in different ways. If only one additional bit is needed, then simply use the reserved bit. If more than one additional bit is needed, then one of the following options may be used:

Option 1: Define a new EHT Trigger type for each Trigger variant.

There are only 7 Trigger Type subfield values, not enough to cover 8 Trigger variants defined in 11ax. It may be possible to look at each Trigger variant and only define new Trigger Types for those existing 11ax Trigger variant is not enough to cover 11be features.

Option 2: Define a new Trigger type for EHT and define different subtypes for each Trigger variant in Trigger Dependent Common Info field, similar to the way 11az defines the Ranging Trigger frame and Ranging Trigger Subtypes.

For example, use the value 9 for all EHT Trigger frame variants

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report (BSRP) |
| 5 | GCR MU-BAR |
| 6 | Bandwidth Query Report Poll (BQRP) |
| 7 | NDP Feedback Report Poll (NFRP) |
| 8 | Ranging |
| 9 | EHT |
| 10-15 | Reserved |

Then, define different EHT Trigger frame variants as subtypes in the Trigger Dependent Common Info field corresponding to the Trigger Type of EHT.

| | EHT Trigger Subtype | ... |
|---|---|---|
| Bits | 4 | ... |

Trigger Dependent Common Info field when the Trigger Type subfield value is 9 (EHT)

| EHT Trigger Subtype field value | Trigger frame variant |
|---|---|
| 0 | EHT Basic |
| 1 | EHT Beamforming Report Poll (BFRP) |
| 2 | EHT MU-BAR |
| 3 | EHT MU-RTS |
| 4 | EHT Buffer Status Report (BSRP) |
| 5 | EHT GCR MU-BAR |
| 6 | EHT Bandwidth Query Report Poll (BQRP) |
| 7 | EHT NDP Feedback Report Poll (NFRP) |
| 8 | EHT Ranging |
| 9-15 | Reserved |

EHT Trigger Subtype Field Encoding

Note that in both Option 2 and Option 3, HE STAs will not be able to understand the new EHT Trigger variant as it has a new type value.

Option 3: Use a special User Info field with a specific AID value to include the additional common information corresponding to EHT Trigger frames.

Looking at each field individually which is needed to change to cover EHT features.

UL BW: Current UL BW can only indicate up to 160/80+80 MHz, one more bit to indicate 320 MHz is needed.

Number of HE-LTF Symbols And Midamble Periodicity: There is a need for one more bit to support 16 SS.

Sounding symbol repetition and the support of Multi-AP may require more bits apart from the one additional bit due to 16 SS PE Disambiguity: there is a need for more bits to indicate PE duration larger than 16 us.

UL HE-SIG-A2 Reserved: there is a need for several more bits.

U-SIG contents will be different with HE-SIG-A. The exact number of bits to be reserved is TBD but very likely different with 11ax.

there may be a need to add another bit to indicate whether the Trigger frame solicits EHT TB PPDU or HE TB PPDU.

Figure 2:
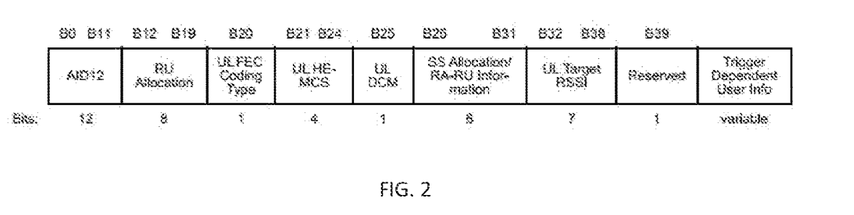
FIG. 2 illustrates a User Info field of the Trigger frame, in accordance with some embodiments.

Looking next at the User Info field of the Trigger frame (see FIG. 2).

RU Allocation:

To address the Multi-RU feature introduced in 11be that enables assignment of multiple RU allocations to one STA, the following options are possible:

Option 1: Expand the RU Allocation field and update the RU allocation table to cover all possible RU combinations allowed in 11be Option 2: Allocate two User Info fields for one STA. The two User Info fields will have the same AID12 value corresponding to this STA.

In this case, one indication bit or one entry in one of the fields in the first User Info field may be included to indicate to the STA that it has a second User Info field.

SS Allocation/RA-RU Information:

Two more bits are needed to cover 16 SS.

NDP Announcement Frame

Figure 3A:
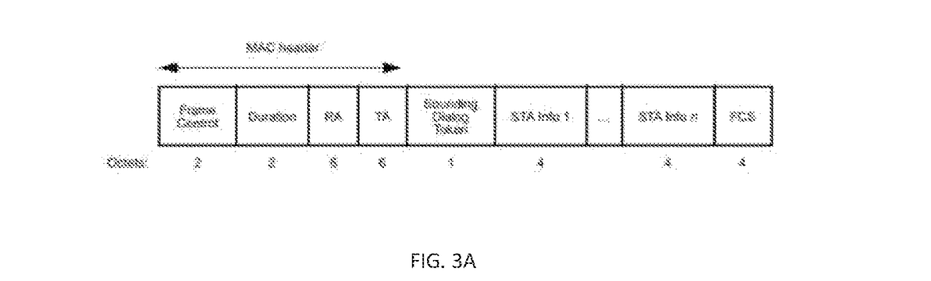
FIG. 3A illustrates common info part of HE NDP announcement frame, in accordance with some embodiments.

Looking first at the common info part of HE NDPA frame (FIG. 3A).

Figure 3B:
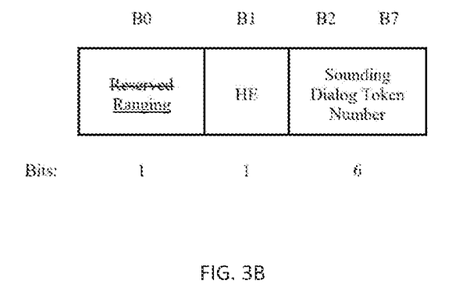
FIG. 3B illustrates a Sounding Dialog Token of an NDP announcement frame, in accordance with some embodiments.

Common Info Part:

Sounding Dialog Token (FIG. 3B):

Currently, there are no reserved bit in Sounding Dialog Token field as the last reserved bit was already taken by 11az.

Currently, the encoding of B0B1 values are as follows:

| Ranging subfield | HE subfield | Encoding |
| --- | --- | --- |
| 0 | 0 | VHT NDPA |
| 0 | 1 | HE NDPA |
| 1 | 0 | Ranging NDPA |
| 1 | 1 | Reserved |

It is possible to use the reserved value of 11 of B0 B1 for EHT variant NDPA, but there is a need to address potential ambiguity for HE and legacy STA.

If there are some additional information that is needed to be put in the common part of EHT NDPA frame, a special STA Info field with a specific AID may be created and put the additional information in the special STA Info field.

Similar to what was done in 11ax when the AID11 field is equal to 2047, during which case additional information may be added.

STA Info Part:

Looking next at the STA Info field when the AID11 subfield is not 2047. (See FIG. 4A).

Partial BW Info: (see FIG. 4B)

Figure 4A:
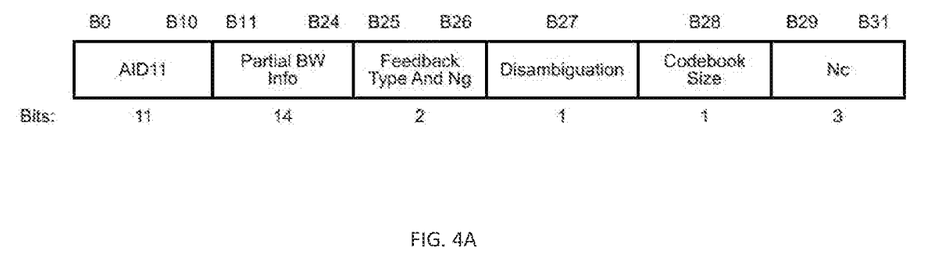
FIG. 4A illustrates STA Info field when the AID11 subfield is not 2047, in accordance with some embodiments.
Figure 4B:
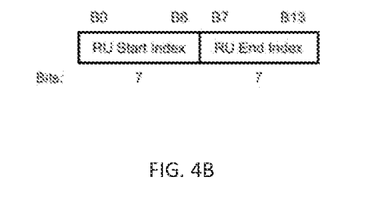
FIG. 4B illustrates Partial BW Info subfield of the STA Info field, in accordance with some embodiments.

Discontinuous RUs in EHT may impact this field in terms of RU Start Index and RU End Index within this field.

Also, there are 148 26-tone RUs in 320 MHz BW, it cannot cover 320 MHz channel bandwidth as it is.

One possible solution to squeeze the number of bits needed for Partial BW Info:

Keep the first 7 or 8 bits to indicate the RU Start Index. Use the subsequent 4 to 5 bits to indicate the total span of feedback bandwidth.

Alternatively, use the first 7 or 8 bits to indicate the center (subcarrier) of the partial BW. Use the subsequent 3 or 4 bits to indicate the half span of the feedback bandwidth, which may save 1 bit due to the reduced span.

If there are punctured channels within the span, the punctured channels are indicated in the common part of the NDPA frame and the corresponding feedbacks are knocked out from the feedback report.

As a result, more than 1 bit may be possible.

The indication ideas for the partial BW can be applied to the partial BW indication in the preamble of the PPDU i.e. the PHY header as well, where there are also common info field and user info field. Similarly, the common punctured channels can be indicated in the common info field and the location/span of the partial BW can be indicated in the user info field.

Disambiguation:

Currently set to 1 to prevent VHT STA from parsing B16-B27 as his own AID. If it turns out that the sizes are different between HE NDPA and EHT NDPA frame, the disambiguation among VHT, HE, and EHT may need to be addressed to prevent VHT and HE STA from wrongly parsing his own AID. There may be a need to expand the Disambiguation subfield to 2 bits to address this issue.

Nc: If a STA supports 16 SS, then one additional bit may be needed to indicate Nc.

If it turns out that it is not possible to cover all information for one EHT STA in one STA Info field and meanwhile want to keep the size of STA Info field unchanged, two STA Info fields could also be allocated to one EHT STA to cover the additional information.

Figure 5:
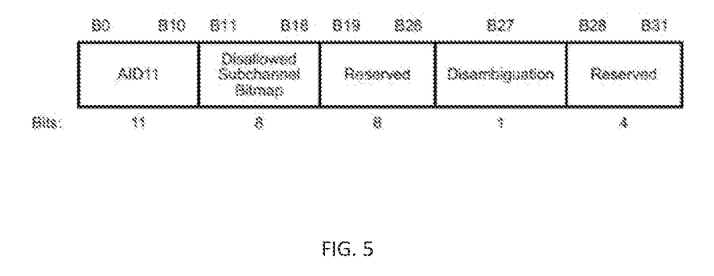
FIG. 5 illustrates STA Info field when the AID11 subfield is 2047, in accordance with some embodiments.

Finally, looling at the STA Info field when the AID11 subfield is 2047 (FIG. 5).

Disallowed Subchannel Bitmap:

There is a need to extend the field to 16 bits to cover all 20 MHz channel now that there is 320 MHz. Eight reserved bits B19-B26 may be simply used to cover the signaling here.

Same as the previous one, two STA Info fields may be allocated to cover the additional information when the AID11 subfield is 2047, if it turns out that the 12 reserved bits are not enough to cover all additional information.

Special User Info field—If the Special User Info field is included in the Trigger frame, then the Special User Info Field Present subfield of the EHT variant of the Common Info Field is set to 0, otherwise it is set to 1. The Special User Info field is identified by an AID12 value of 2007 and is optionally present in a Trigger frame that is generated by an EHT AP. An EHT AP does not use the value 2007 as an AID for any STA associated to it.

The VHT/HE/EHT NDP Announcement frame has three variants, the VHT NDP Announcement frame, the HE NDP Announcement frame, and the EHT NDP Announcement frame. The variants are distinguished by the setting of the HE subfield and the Ranging subfield in the Sounding Dialog Token field.

The VHT/HE/EHT NDP Announcement frame contains at least one STA Info field. If the VHT/HE/EHT NDP Announcement frame contains only one STA Info field, then the RA field is set to the address of the STA that can provide feedback. If the VHT/HE/EHT NDP Announcement frame contains more than one STA Info field, then the RA field is set to the broadcast address.

The TA field is set to the address of the STA transmitting the VHT/HE/EHT NDP Announcement frame or the bandwidth signaling TA of the STA transmitting the VHT/HE/EHT NDP Announcement frame. In a VHT/HE/EHT NDP Announcement frame transmitted by an EHT STA that is a STA 6G with 320 MHz bandwidth support in a non-HT or non-HT duplicate format and where the scrambling sequence and SERVICE field carry the TX VECTOR parameter CH_BANDWIDTH_IN_NON_HT, the TA field is a set to a bandwidth signaling TA. Otherwise, in VHT/HE/EHT NDP Announcement frame transmitted by a VHT, HE or EHT STA in a non-HT or non-HT duplicate format and where the scrambling sequence carries the TX VECTOR parameter CH_BANDWIDTH_IN_NON_HT, the TA field is set to a bandwidth signaling TA.

The HE subfield and Ranging subfield in the Sounding Dialog Token field are set to 0 to identify the frame as a VHT NDP Announcement frame; the HE subfield and Ranging subfield are set to 1 and 0 respectively to identify the frame as an HE NDP Announcement frame; the HE subfield and Ranging subfield are set to 1 to identify the frame as a an EHT NDP Announcement frame.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties.

Figure 6:
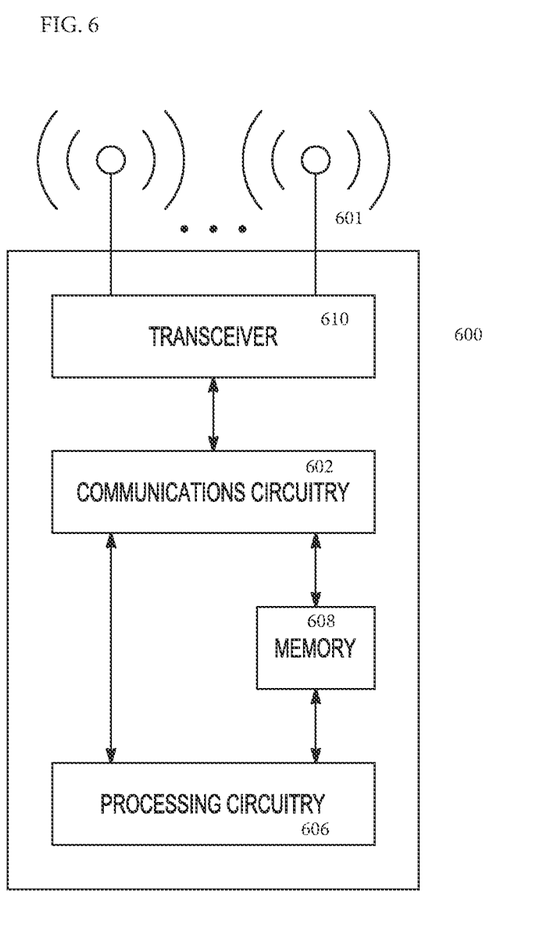
FIG. 6 illustrates a functional block diagram of a wireless communication device, in accordance with some embodiments.

FIG. 6 illustrates a functional block diagram of a communication station (STA) that may be suitable for use as an EHT AP STA, an EHT non-AP STA or other user device in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an extremely high-throughput (EHT) station (STA), the apparatus comprising:
processing circuitry; and memory,
wherein the processing circuitry is configured to:
encode a null data packet (NDP) announcement frame for transmission, the NDP announcement frame encoded to include a high-efficiency (HE) subfield and a Ranging subfield in a Sounding Dialogue Token field; and encode a trigger frame for transmission to solicit trigger-based physical layer protocol data units (TB PPDUs), wherein to identify the NDP announcement frame as an EHT NDP announcement frame, the processing circuitry is configured to set both the HE subfield and the Ranging subfield in the Sounding Dialogue Token field to a value of one, wherein to identify the NDP announcement frame as a HE NPD announcement frame, the processing circuitry is configured to set the HE subfield to a value of one and set the Ranging subfield to a value of zero, wherein when the EHT station is operating as an EHT access point (AP), the processing circuitry is configured to encode the trigger frame to include a Special User Info Field, the Special User Info Field identified by a predetermined value as an STA association identifier (AID) value to indicate that the trigger frame is generated by an EHT AP STA rather than an EHT non-AP STA, wherein when the trigger frame is soliciting an EHT TB PPDU, the processing circuitry is configured to encode to the trigger frame to indicate that the EHT TB PPDU is being solicited rather than an HE TB PPDU, and wherein when the trigger frame is solicitating the HE TB PPDU, the processing circuitry is configured to encode to the trigger frame to indicate that the HE TB PPDU is being solicited rather than the EHT TB PPDU.

2. The apparatus of claim 1, wherein the processing circuitry is configured to set both the HE subfield and the Ranging subfield to a value of zero to identify the NDP announcement frame as a very-high throughput (VHT) VHT NDP announcement frame.

3. The apparatus of claim 1, wherein the trigger frame is encoded to allocate resources to one or more non-AP STAs, and wherein in response to the trigger frame, the processing circuitry is configured to decode the TB PPDUs from the one or more non-AP STAs.

4. The apparatus of claim 1, wherein the EHT STA comprises a MAC layer and a PHY layer, and wherein for transmission of the NDP announcement frame, the MAC layer is configured to encode the NDP announcement frame for transmission by the PHY layer.

5. The apparatus of claim 4, wherein the PHY layer includes a transceiver coupled to one or more antennas for transmission of the NDP announcement frame, and wherein the memory is configured to store the NDP announcement frame.

6. A non-transitory computer-readable storage medium that stores instructions for execution by processing circuitry of an extremely high-throughput (EHT) station (STA), wherein the processing circuitry is configured to:

encode a null data packet (NDP) announcement frame for transmission, the NDP announcement frame encoded to include a high-efficiency (HE) subfield and a Ranging subfield in a Sounding Dialogue Token field; and encode a trigger frame for transmission to solicit trigger-based physical layer protocol data units (TB PPDUs), wherein to identify the NDP announcement frame as an EHT NDP announcement frame, the processing circuitry is configured to set both the HE subfield and the Ranging subfield in the Sounding Dialogue Token field to a value of one, wherein to identify the NDP announcement frame as a HE NPD announcement frame, the processing circuitry is configured to set the HE subfield to a value of one and set the Ranging subfield to a value of zero, wherein when the EHT station is operating as an EHT access point (AP), the processing circuitry is configured to encode the trigger frame to include a Special User Info Field, the Special User Info Field identified by a predetermined value as an STA association identifier (AID) value to indicate that the trigger frame is generated by an EHT AP STA rather than an EHT non-AP STA, wherein when the trigger frame is soliciting an EHT TB PPDU, the processing circuitry is configured to encode to the trigger frame to indicate that the EHT TB PPDU is being solicited rather than an HE TB PPDU, and wherein when the trigger frame is solicitating the HE TB PPDU, the processing circuitry is configured to encode to the trigger frame to indicate that the HE TB PPDU is being solicited rather than the EHT TB PPDU.

7. The non-transitory computer-readable storage medium of claim 6, wherein the processing circuitry is configured to set both the HE subfield and the Ranging subfield to a value of zero to identify the NDP announcement frame as very-high throughput (VHT) VHT NDP announcement frame.

8. The non-transitory computer-readable storage medium of claim 6, wherein the trigger frame is encoded to allocate resources to one or more non-AP STAs and to solicit one or more uplink trigger-based (TB) PPDUs from the one or more non-AP STAs, and wherein in response to the trigger frame, the processing circuitry is configured to decode the one or more TB PPDUs from the one or more non-AP STAs.

9. An apparatus for an extremely high-throughput (EHT) station (STA), the apparatus comprising: processing circuitry; and memory, wherein the processing circuitry is configured to:

decode a null data packet (NDP) announcement frame from an EHT access point (AP), the NDP announcement frame including a high-efficiency (HE) subfield and a Ranging subfield in a Sounding Dialogue Token field; and identify the NDP announcement frame as an EHT NDP announcement frame if both the HE subfield and the Ranging subfield in the Sounding Dialogue Token field are set to a value of one;

identify the NDP announcement frame as a HE NDP Announcement frame if the HE subfield is to a value of one and the Ranging subfield is set to a value of zero;

decode a trigger frame soliciting trigger-based physical layer protocol data units (TB PPDUs), wherein the trigger frame includes a Special User Info Field, the Special User Info Field identified by a predetermined value as an STA association identifier (AID) value to indicate when the trigger frame is generated by an EHT AP STA rather than an EHT non-AP STA, wherein when the trigger frame is soliciting an EHT TB PPDU, the trigger frame is encoded to indicate that the EHT TB PPDU is being solicited rather than an HE TB PPDU, and wherein when the trigger frame is solicitating the HE TB PPDU, the trigger frame is encoded to indicate that the HE TB PPDU is being solicited rather than the EHT TB PPDU, and wherein the memory is configured to store the NDP announcement frame.

10. The apparatus of claim 9, wherein the processing circuitry is further configured to:
identify the NDP announcement frame as a very-high throughput (VHT) NDP announcement frame if both the HE subfield and the Ranging subfield are to a value of zero.

* * * * *